March 17, 1970  A. N. EDE  3,500,564

MOLE PLOUGH DRIVE WINCH CONTROL

Filed March 8, 1968

Inventor
AINSLEY N. EDE
By,

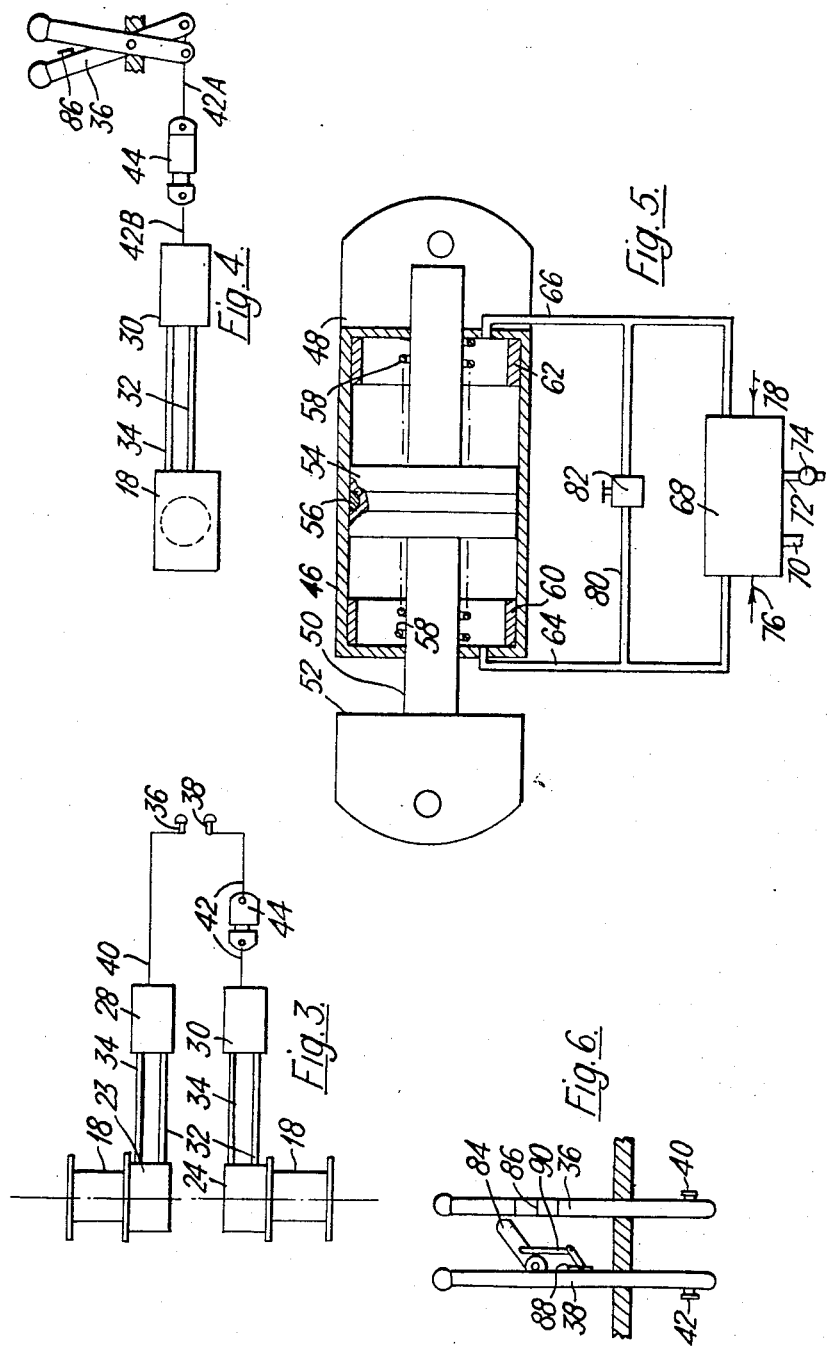

United States Patent Office 3,500,564
Patented Mar. 17, 1970

3,500,564
MOLE PLOUGH DRIVE WINCH CONTROL
Ainsley N. Ede, 36 Thornton Way,
Cambridge, England
Filed Mar. 8, 1968, Ser. No. 711,803
Claims priority, application Great Britain, Mar. 10, 1967,
11,289/67
Int. Cl. E02f 5/18; F11l 1/00; A01b 3/66
U.S. Cl. 37—193                                      6 Claims

ABSTRACT OF THE DISCLOSURE

Mole plough apparatus comprises a mole plough supported on a vehicle; the vehicle supports two horizontally disposed winches each displaced towards a respective side of the vehicle and which receive cables for dragging the vehicle over the ground. Means are provided for controlling the relative peripheral speeds of the two winches so as to control the attitude of the vehicle about a vertical axis.

The invention relates to mole plough apparatus, for producing below-ground passages as used for example in pipe-laying and similar operations.

The invention is concerned with the control of the line of the passage produced.

According to the invention there is provided mole plough apparatus, comprising a mole plough element supported on a vehicle by means of which the mole plough element is dragged through the ground as the vehicle moves in a forward direction, a pair of winches mounted on the vehicle each being rotatable about an axis transverse to the fore and aft axis of the vehicle, the two winches being arranged to receive respective cables for applying forces to the vehicle to draw it in the forward direction, and control means operative to control the instantaneous relative lengths of the cables whereby to control the attitude of the vehicle about an axis perpendicular to the ground.

Mole plough apparatus embodying the invention will now be described by way of example and with reference to the accompanying drawings in which:

FIGURE 3 is a schematic plan view of the steering control arrangement of the apparatus;

FIGURE 4 is a schematic side elevation of the arrangement of FIGURE 3;

FIGURE 5 is a diagrammatic sectional view, to an enlarged scale, of part of the arrangement of FIGURES 3 and 4; and FIGURE 6 is an end view of the arrangement of FIGURE 5.

Figure 1:
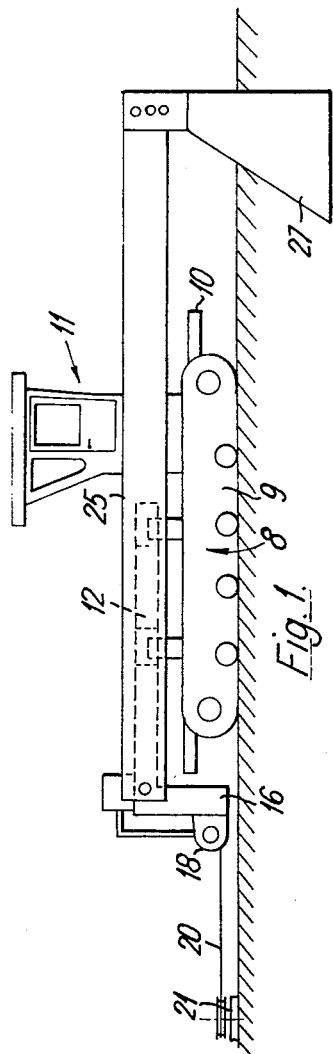
FIGURE 1 is a diagrammatic side elevation of the apparatus.
Figure 2:
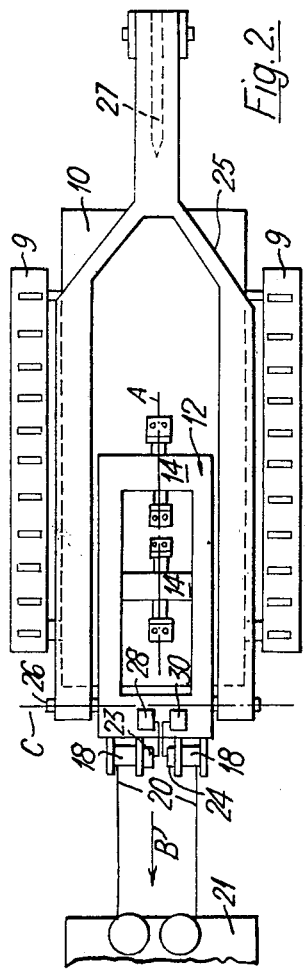
FIGURE 2 is a plan view of the apparatus of FIGURE 1.

Referring firstly to FIGURES 1 and 2, the apparatus comprises a tracked vehicle 8 having tracks 9, a platform 10 and an operator's cabin 11 (the latter omitted from FIGURE 2), all illustrated somewhat diagrammatically. The platform 10 supports an inner frame 12. The frame 12 has two cross-members 14 by means of which the frame is attached to the vehicle so as to be pivotable about the fore and aft axis A of the vehicle. The frame 12 has two cross-members 14 by means of supports two winches 18. Cables 20 engage the winches, and connect to a ground anchor 21. Each winch has a hydraulic motor 23, 24, and by means of the motors and the cables a horizontal force can be applied to draw the vehicle in the direction of the arrow B.

The apparatus also comprises an outer frame 25 which is pivoted to the inner frame 12 at an attachment 26 so as to be pivotable about an axis C perpendicular to the axis A. The frame 25 supports the mole plough element 27 at its distal end, the element 27 being shown in the form of a blade having a V-form leading edge, though it may take any other suitable form.

In use, the vehicle is drawn in the direction of the arrow B and the blade 27 is dragged through the ground to form a slit trench for pipe-laying purposes.

Each of the motors 23, 24 is controlled by a respective variable hydraulic pump 28, 30 through go and return pipes 32, 34 (FIGURE 3). The pumps are controlled by separate levers 36, 38 (not shown in FIGURES 1 and 2) to which they are connected by links 40, 42 and which are situated in the operator's cabin 11. In use, the operator steers the vehicle 8 (and thus determines the line of the trench produced by the mole plough 27) by adjusting the levers 36, 38 to vary the relative speeds of the motors 23, 24. Alternatively, if there is a constraint, due, for instance to sloping ground tending to cause the machine to move on a curve, the operator can, by adjustment of the levers 36, 38 increase the power supplied to one motor so as to cause the vehicle and the mole plough to maintain a straight line.

The arrangement also includes provision for automatic steering which will now be described with particular reference to FIGURES 3 to 6. As shown in FIGURES 3 and 4, the link 42 includes a hydraulically operable ram assembly 44 by means of which the effective length of the link 42, and thus the hydraulic output of the pump 28, can be varied. The ram assembly 44 is illustrated in FIGURE 5 and is interposed between two portions 42A and 42B of the link 42. The ram assembly comprises a cylinder 46 connected by a bracket 48 to the link portion 42A, and a rod 50 which is connected by a bracket 52 to the link portion 42B, the rod 50 carrying the ram 54 which is a sliding fit in the cylinder. The ram 54 has a sealing ring 56 and is centralised by biasing springs 58. The maximum to and fro movement of the ram 54 is limited by stops 60, 62, and pipes 64, 66 feed hydraulic fluid to and from the cylinder.

The flow of hydraulic fluid to and from the cylinder is controlled by a solenoid operated control valve 68 which is connected to a source of hydraulic fluid under pressure by pipes 70, 72, the latter including an adjustable pressure-control valve 74.

The solenoid valve is controlled by two electrical lines 76, 78 which are pulse-energised under the control of automatic steering gear, not shown, which is responsive to the deviation of the vehicle from a desired path. Pulse energisation of line 76 causes the valve 68 to feed hydraulic fluid through pipe 64 to displace ram 54 to the right (as shown in FIGURE 5) thus effectively shortening the link 42, while energisation of line 78 causes the valve to feed hydraulic fluid through pipe 66 to displace the ram to the left thus effectively lengthening the link 40. A cross pipe 80, including an adjustable leak valve 82, connects pipes 76 and 78 and allows the pressure on opposite sides of the ram 54 to equalise. Thus, pulse energisation of one or other of the lines 76, 78 causes momentary displacement of the ram to one side or the other to effect the desired steering correction, whereupon the ram returns to its central position under control of springs 58.

In order to put the automatic steering arrangement, described above, into operation, the two levers 36, 38 are locked together by a latch member 84 (FIGURE 6) pivotally supported on lever 38 which engages a latch 86 on lever 36. When moved into the latching position, the latch member 84 operates an electrical switch 88 by means of a link 90. The switch 88 is connected to the solenoid valve 68 whereby the latter is held in the OFF position until the switch is operated. When the levers 36, 38 are latched together by member 84 they can still be operated in unison to vary the general speed of the vehicle.

As described above, the vehicle is steered by controlling the relative peripheral speeds of the two winches so as to control the instantaneous relative effective lengths of the two cables. Other ways of controlling the relative effective lengths of the two cables may be used as for example by moving one of the winches in a fore and aft direction or by moving a pulley or other member into contact with the cable.

What is claimed is:
1. Mole plough apparatus, comprising
   a mole plough element supported on the vehicle by means of which the plough element is dragged through the ground as the vehicle moves in a forward direction,
   a pair of winches mounted on the vehicle each being rotatable about an axis transverse to the fore and aft axis of the vehicle, the two winches receiving respective cables for applying forces to the vehicle to draw it in the forward direction, and
   control means operatively associated with the cables to control the instantaneous effective length of one cable relative to the other and thereby control the attitude of the vehicle about an axis perpendicular to the ground.
2. Apparatus according to claim 1, in which the control means is connected to the winches to control the relative peripheral speeds of the two winches and thus the instantaneous relative effective lengths of the two cables.
3. Apparatus according to claim 1, in which the control means includes respective links and manually operable levers connected to control the peripheral speeds of the two winches, and releasable means operable to lock the levers together, at least one said link including means operative to alter the effective length of the link when the levers are locked together whereby to control the relative peripheral speeds of the two winches and thus the instantaneous relative effective lengths of the two cables.
4. Apparatus according to claim 3, in which the adjusting means comprises a ram movable to and fro in a cylinder, a source of pressure, and means adjustably applying the pressure to the cylinder, the said one link being split into two portions one of which is connected to the cylinder and the other of which is connected to the ram.
5. Apparatus according to claim 4, in which the means adjustably applying the pressure to the cylinder comprises guidance means responsive to the deviation of the attitude of the vehicle, about the said axis perpendicular to the ground, from a desired attitude.
6. Apparatus according to claim 4, including means biasing the ram to a position substantially centrally in the cylinder, and pressure conducting means interconnecting the two ends of the cylinder to allow the pressure on opposite sides of the ram to equalise at a controlled rate, whereby the ram returns to the substantially central position after being momentarily displaced therefrom by the said pressure.

References Cited

UNITED STATES PATENTS

| | | | | |
|---|---|---|---|---|
| 2,638,832 | 5/1953 | Kiwsinger | | 37—193 |
| 3,140,745 | 7/1964 | Hinkle et al. | | 61—72.4 |

FOREIGN PATENTS

| | | |
|---|---|---|
| 1,045,696 | 8/1957 | Germany. |

ROBERT E. PULFREY, Primary Examiner

E. H. EICKHOLT, Assistant Examiner

U.S. Cl. X.R.

61—72.1; 72—23